US012585101B2

(12) United States Patent
Tsuchiya et al.

(10) Patent No.: US 12,585,101 B2
(45) Date of Patent: Mar. 24, 2026

(54) OBSERVATION HOLDER, OBSERVATION APPARATUS, OBSERVATION CHIP, AND METHOD OF MANUFACTURING OBSERVATION CHIP

(71) Applicants: HIRATA CORPORATION, Kumamoto (JP); ODC Management Co. Ltd., Tokyo (JP)

(72) Inventors: Tomoko Tsuchiya, Tokyo (JP); Shiro Kanegasaki, Tokyo (JP); Seigo Murakami, Kumamoto (JP); Kenji Morita, Kumamoto (JP)

(73) Assignees: HIRATA CORPORATION, Kumamoto (JP); ODC MANAGEMENT CO. LTD., Tokyo (JP)

( * ) Notice: Subject to any disclaimer, the term of this patent is extended or adjusted under 35 U.S.C. 154(b) by 608 days.

(21) Appl. No.: 17/884,026

(22) Filed: Aug. 9, 2022

(65) Prior Publication Data

US 2022/0382034 A1 Dec. 1, 2022

Related U.S. Application Data

(63) Continuation of application No. PCT/JP2020/013090, filed on Mar. 24, 2020.

(51) Int. Cl.
*G02B 21/34* (2006.01)
*G02B 21/24* (2006.01)
(Continued)

(52) U.S. Cl.
CPC ............. *G02B 21/24* (2013.01); *G02B 21/26* (2013.01); *G02B 21/34* (2013.01); *G02B 21/36* (2013.01)

(58) Field of Classification Search
CPC ................ G02B 21/00; G02B 21/0004; G02B 21/0008; G02B 21/0012; G02B 21/0016;
(Continued)

(56) References Cited

U.S. PATENT DOCUMENTS

| | | | | |
|---|---|---|---|---|
| 4,722,598 A | * | 2/1988 | Ford | G02B 21/34 |
| | | | | 359/398 |
| 9,518,920 B2 | * | 12/2016 | Fine | G01N 21/59 |

(Continued)

FOREIGN PATENT DOCUMENTS

| | | |
|---|---|---|
| CN | 108239600 A | 7/2018 |
| CN | 208795640 U | 4/2019 |

(Continued)

OTHER PUBLICATIONS

Office Action (First Office Opinion Notice) issued on Sep. 25, 2024, in corresponding Chinese Patent Application No. 202080098586.3 and machine English translation of the Office Action. (14 pages).
(Continued)

*Primary Examiner* — Thong Q Nguyen

(74) *Attorney, Agent, or Firm* — Buchanan Ingersoll & Rooney PC

(57) ABSTRACT

The present invention relates to an observation holder, including an accommodation unit configured to accommodate an observation target, and an observation unit formed below the accommodation unit, wherein an observation target accommodated in the accommodation unit can be observed from below, the accommodation unit includes an accommodation unit main body in which a plurality of holes for accommodating an observation target are formed, and an accommodation unit upper portion formed on an upper portion of the accommodation unit main body, the accommodation unit upper portion includes a wall surrounding a space above the accommodation unit main body, as a storage
(Continued)

for storing a predetermined liquid, and two adjacent holes of the plurality of holes are connected in the observation unit.

13 Claims, 7 Drawing Sheets

(51) Int. Cl.
   *G02B 21/26*        (2006.01)
   *G02B 21/36*        (2006.01)

(58) Field of Classification Search
   CPC .............. G02B 21/002; G02B 21/0024; G02B 21/0028; G02B 21/0032; G02B 21/0036; G02B 21/0088; G02B 21/24; G02B 21/241; G02B 21/26; G02B 21/34; G02B 21/36; G02B 21/362
   USPC .................................................. 359/368–398
   See application file for complete search history.

(56) References Cited

U.S. PATENT DOCUMENTS

| | | | |
|---|---|---|---|
| 9,617,508 | B2 | 4/2017 | Tanaka et al. |
| 10,202,572 | B2 | 2/2019 | Tanaka et al. |
| 10,501,718 | B2 | 12/2019 | Matsushita et al. |
| 11,333,596 | B2 | 5/2022 | Kimura et al. |
| 2020/0096435 | A1 | 3/2020 | Kimura et al. |
| 2020/0271913 | A1 | 8/2020 | Honda et al. |

FOREIGN PATENT DOCUMENTS

| | | | |
|---|---|---|---|
| JP | 2003088357 | A | 3/2003 |
| JP | 2005333912 | A | 12/2005 |
| JP | 2007124904 | A | 5/2007 |
| JP | 2011-38923 | * | 2/2011 |
| JP | 2011038923 | A | 2/2011 |
| JP | 2014064507 | A | 4/2014 |
| JP | 2018102295 | A | 7/2018 |
| WO | 2005054425 | A | 6/2005 |
| WO | 2019064984 | A1 | 4/2019 |

OTHER PUBLICATIONS

Extended European Search Report dated Jan. 2, 2023, issued in corresponding European Application No. 20927398.6. (9 pages).
International Search Report (PCT/ISA/210) with translation and Written Opinion (PCT/ISA/237) mailed on Jun. 23, 2020, by the Japan Patent Office as the International Searching Authority for International Application No. PCT/JP2020/013090. (15 pages).
Taiwan Office Action issued in corresponding Taiwan Patent Application No. 110109951 dated Nov. 16, 2018. (3 pages).

* cited by examiner

FIG. 1

F I G.　8F
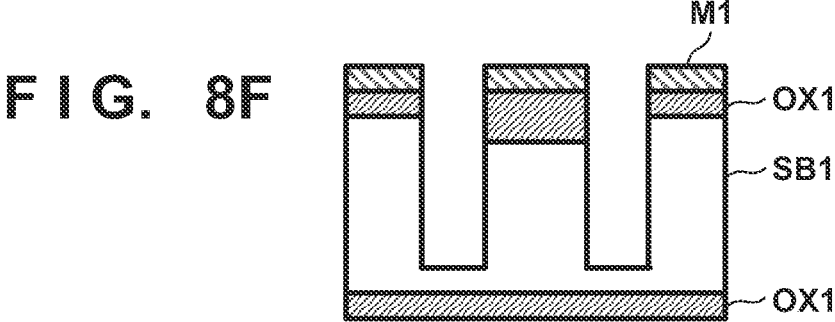
F I G.　8G
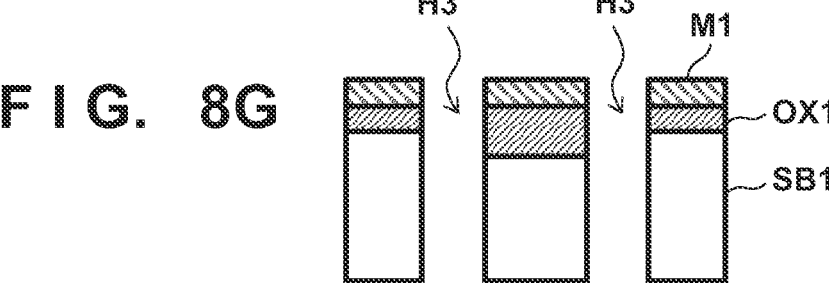
F I G.　8H
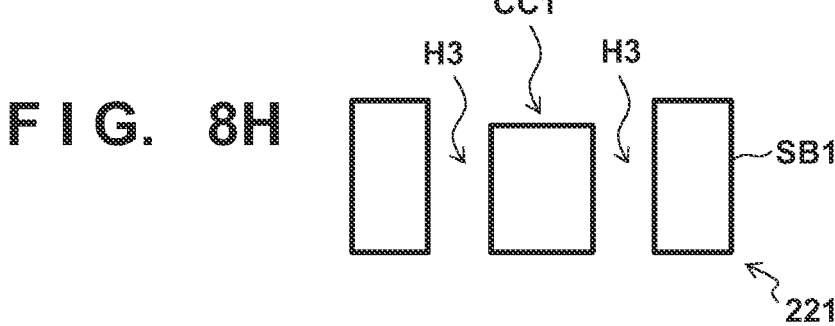
F I G.　8I
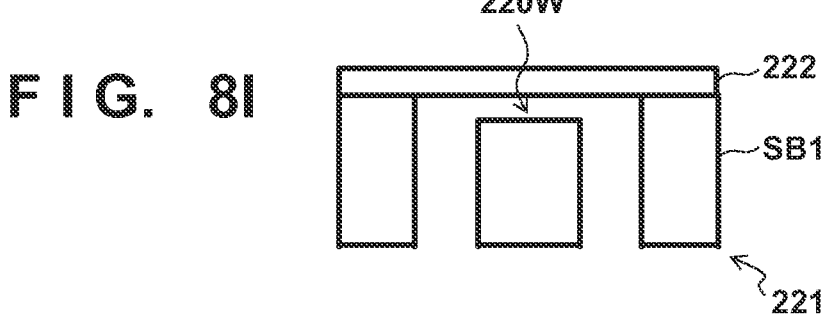

OBSERVATION HOLDER, OBSERVATION APPARATUS, OBSERVATION CHIP, AND METHOD OF MANUFACTURING OBSERVATION CHIP

CROSS-REFERENCE TO RELATED APPLICATION(S)

This application is a continuation of International Patent Application No. PCT/JP2020/013090 filed on Mar. 24, 2020, the entire disclosures of which is incorporated herein by reference.

TECHNICAL FIELD

The present invention relates to an observation holder (mainly a cell observation holder).

BACKGROUND ART

PTL 1 and PTL 2 describe the structure of an observation holder for accommodating an observation target such that the target is observable. The observation holder is so configured that a cell as an observation target can be observed from below the observation holder. By using the observation holder like this, a user such as a medical doctor, a laboratory technician, or a researcher can observe an observation target by an image via a predetermined observation instrument (for example, a microscope or an imaging camera). Examples of the observation target are a tissue or a body fluid itself as a constituent element of a cell of an animal including a human, for example, a blood or a lymph of a human or a mouse, an ascites and a peritoneal lavage fluid, a bronchoalveolar lavage fluid, various white blood cells and other cells as components thereof, and a cancer cell separated from a tissue and an established cultured cell; and a separated plant cell including a microorganism such as a fungus. An observation holder that allows a user to simultaneously observe a plurality of different functions of a cell as an observation target by using an image can be used in, for example, a mass screening test for a newborn baby and diagnoses of various diseases (PTL 3).

CITATION LIST

Patent Literature

PTL 1: Japanese Patent Laid-Open No. 2007-124904
PTL 2: Japanese Patent Laid-Open No. 2011-038923
PTL 3: Japanese Patent Laid-Open No. 2018-102295

SUMMARY OF INVENTION

Technical Problem

It is necessary to further improve the structure of the above-described observation holder to make it possible to simply and efficiently observe a plurality of different characteristics and a plurality of different functions of many cells as observation targets at once, and to simultaneously perform these observations and measurements on many samples, for example, many patient samples at once.

It is an exemplary object of the present invention to provide a novel structure of an observation holder capable of performing simple and efficient observations of a plurality of different characteristics of one observation target, and further capable of performing these observations on many samples at once.

Solution to Problem

One aspect of the present invention relates to an observation holder, and the observation holder is an observation holder including an accommodation unit having a rectangular shape in a planar view and configured to accommodate an observation target, and an observation unit formed below the accommodation unit, wherein the observation unit is configured such that an observation target accommodated in the accommodation unit can be observed from below, the accommodation unit includes an accommodation unit main body in which a plurality of holes for accommodating an observation target are formed to be spaced apart from each other, and an accommodation unit upper portion formed on an upper portion of the accommodation unit main body, the accommodation unit upper portion includes a wall surrounding a space above the accommodation unit main body, as a storage for storing a predetermined liquid, an opening is formed above the space in the accommodation unit upper portion, and the plurality of holes are arrayed in a horizontal direction, each hole vertically extends through the accommodation unit main body and communicates with the opening, and two adjacent holes of the plurality of holes are connected in the observation unit.

Advantageous Effects of Invention

According to the present invention, it is possible to simply and efficiently observe a plurality of different characteristics of one observation target.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 1 is a schematic side view showing a configuration example of an observation apparatus;

FIG. 8F is a view for explaining the manufacturing method of the observation unit;

FIG. 8G is a view for explaining the manufacturing method of the observation unit;

FIG. 8H is a view for explaining the manufacturing method of the observation unit; and FIG. 8I is a view for explaining the manufacturing method of the observation unit.

DESCRIPTION OF EMBODIMENTS

Figure 2:
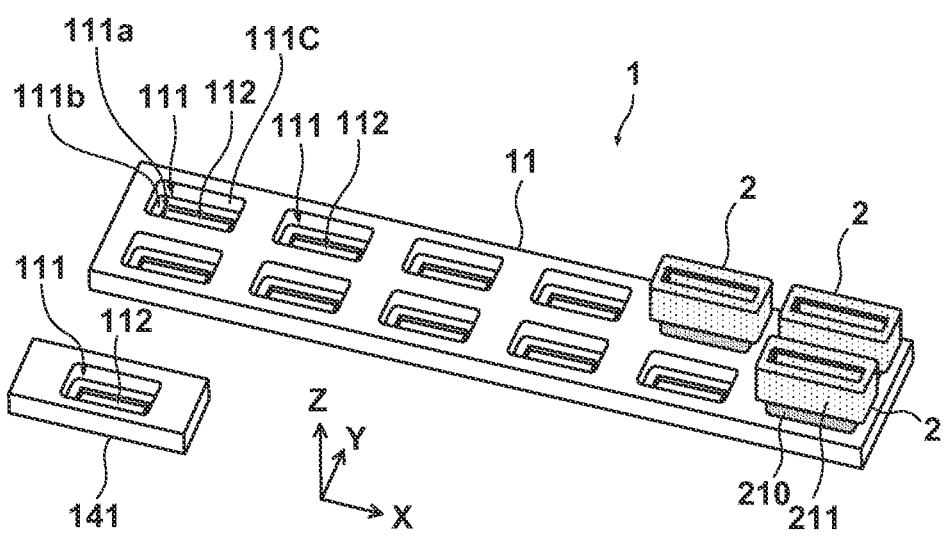
FIG. 2 is a perspective view showing a part of the observation apparatus.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(Overall Configuration of Observation Apparatus)

Figure 1:
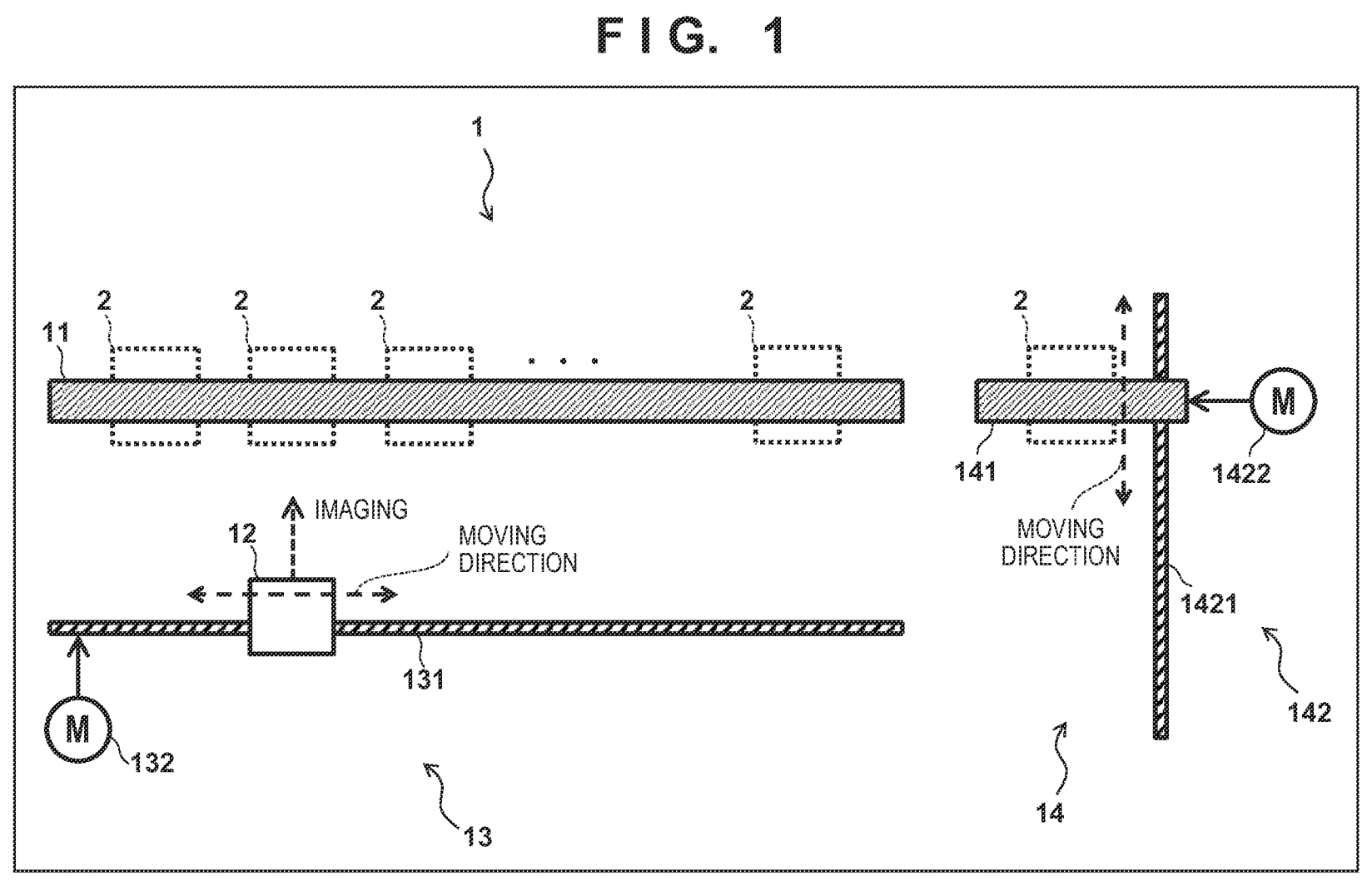

FIG. 1 is a schematic side view showing an observation apparatus 1 according to an embodiment, and FIG. 2 is a perspective view showing a part of the observation apparatus 1. The observation apparatus 1 includes a support base 11, an imaging unit 12, and a moving mechanism 13, and also includes an observation preparation unit 14. In addition, an observation holder 2 (to be described later) not included in the observation apparatus 1 is mounted on the support base 11.

The support base 11 is a plate-like member having a predetermined thickness. The support base 11 can support a plurality of observation holders 2, and the plurality of observation holders 2 are arranged in a horizontal direction on the support table 11. The horizontal direction herein mentioned is a given direction parallel to the upper surface of the support base 11 in a horizontal posture. As will be described in detail later, each observation holder 2 can accommodate a predetermined observation target. An example of the observation target is a white blood cell of an animal such as a human blood.

Note that in FIG. 2, an X direction indicates one of the array directions of the plurality of observation holders 2, and a Y direction indicates the other direction (a direction perpendicular to the X direction) of the array directions. Also, assuming that the array directions are horizontal directions, a Z direction indicates a vertical direction or an up-down direction.

In this embodiment, as will be described in detail later, six recesses 111 are formed in the support base 11 at equal intervals in the X direction, and are arranged in two rows in the Y direction. The observation holder 2 can be mounted as it is fitted in each recess 111. Also, an opening 112 extending in the vertical direction is formed in a bottom 111a of each recess 111 so that the mounted observation holder 2 can be viewed from below.

The bottom 111a of the recess 111 forms the opening 112, and also forms a mounting portion 111b by extending into the form of a flange toward the center from the edges of the opening 112 so that the observation holder 2 can be mounted. The observation holder 2 is mounted by abutting a plate (second plate) 222 of an observation unit 22 (to be described later) of the observation holder 2 against the mounting portion 111b. In addition, the side walls of the recess 111 form a surrounding wall (guide wall) 111c for regulating the movement of the observation holder 2 in the horizontal direction when the observation holder 2 is fitted. The surrounding wall 111c is set to be higher than a main body lower portion 210L of a main body 210 (to be described later) of the observation holder 2, and lower than a main body upper portion of the main body 210.

The imaging unit 12 can capture an image of an observation target accommodated in the observation holder 2, and is installed below the support base 11 in this embodiment. As the imaging unit 12, it is possible to use a device capable of capturing a moving image and/or a still image, for example, a well-known camera including a CCD/CMOS image sensor or the like. Note that in the following explanation, imaging by the imaging unit 12 can also be expressed as observation.

The moving mechanism 13 can horizontally move the imaging unit 12 relative to the support base 11, and the moving direction is practically parallel to the X direction in this embodiment. When the moving mechanism 13 moves the imaging unit 12, the imaging unit 12 is moved to face each of the plurality of openings 112 formed along the X direction. As the moving mechanism 13, it is possible to use a well-known slider mechanism, for example, a rail 131 slidably supporting the imaging unit 12 in the X direction, a nut (not shown) included in the imaging unit 12, a ball screw formed parallel to the rail 131 and rotatably supported by being engaged with the nut, and an electric motor 132 for rotating the ball screw.

In this embodiment, as shown in FIG. 2, the plurality of observation holders 2 include two rows arranged in the Y direction of the six recesses 111 arranged in the X direction, that is, include a total of twelve recesses 111. The moving mechanism 13 can move the imaging unit 12 in the X direction and the Y direction. Alternatively, it is also possible to move the imaging unit 12 in only the X direction by the moving mechanism 13, and install two sets of a combination of the moving mechanism 13 and the imaging unit 12 in the Y direction. Examples of the imaging unit 12 are a vision camera, an objective lens, and another imaging device. When using an objective lens as the imaging unit 12, it is possible to form the imaging unit 12 as an index table, set a plurality of objective lenses having different magnifications on the index table, and select an objective lens having a given magnification by index rotation.

The observation preparation unit 14 is a unit for a user to perform a preparation work. The observation preparation unit 14 includes a preparation support base 141 and a moving mechanism (second moving mechanism) 142. The preparation support base 141 can support the observation holder 2 in a state (unaccommodated state) in which no observation target is accommodated. A recess 111 and an opening 112 are formed in the preparation support base 141 like those of the support base 11. As will be described in detail later, the user can make preparations for observation by accommodating an observation target in the observation holder 2 supported by the preparation support base 141, by injecting the observation target by using a predetermined instrument or device, for example, a manual injector such as a syringe or a dropper, or an automatic injector such as a vertical 6-axis robot or a SCARA robot.

Note that workers such as a medical doctor, a laboratory technician, and a researcher can be taken as typical examples of the user, but the user can also be an industrial robot or a manipulator that operates based on instructions from one or more of these workers.

The moving mechanism 142 can move the preparation support base 141 in a predetermined direction (at least the Z direction). When using the preparation support base 141, for example, the height of the preparation support base 141 can be adjusted by operating the moving mechanism 142, thereby making preparations for observation. As the moving mechanism 142, it is possible to use a well-known slider mechanism, for example, a rail 1421 for slidably supporting the preparation support base 141, and an electric motor 1422 for sliding the preparation support base 141 along the rail 1421.

As will be described in detail later, in the observation apparatus 1 as explained above, the user injects an observation target into the observation holder 2 supported by the preparation support base 141, thereby making preparations for observation. After that, the user transfers the observation holder 2 from the preparation support table 141 to the support table 11, thereby completing the setting of the observation holder 2 with respect to the observation apparatus 1. Then, the user observes the observation target from below the observation holder 2 by using the imaging unit 12. The preparations of the observation target are to make it possible to cause the imaging unit 12 to capture an image of the observation unit 22 (to be described later) of the observation holder 2 from below, and inject the observation target into a predetermined position (observation position) of the observation holder 2 while checking the captured image, thereby placing a cell as the observation target in the observation position. The observation apparatus 1 can also be called an observation system, an evaluation apparatus, an evaluation system, a diagnostic apparatus, a diagnostic system, or the like.

(Configuration of Observation Holder)

Figure 3:
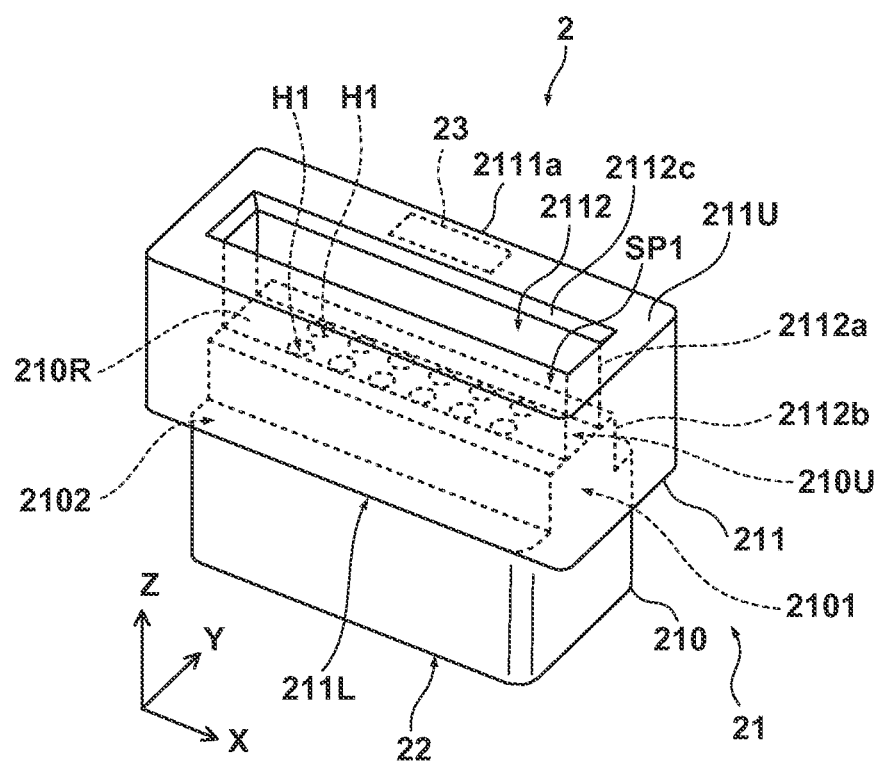
FIG. 3 is a perspective view showing an observation holder.
Figure 4:
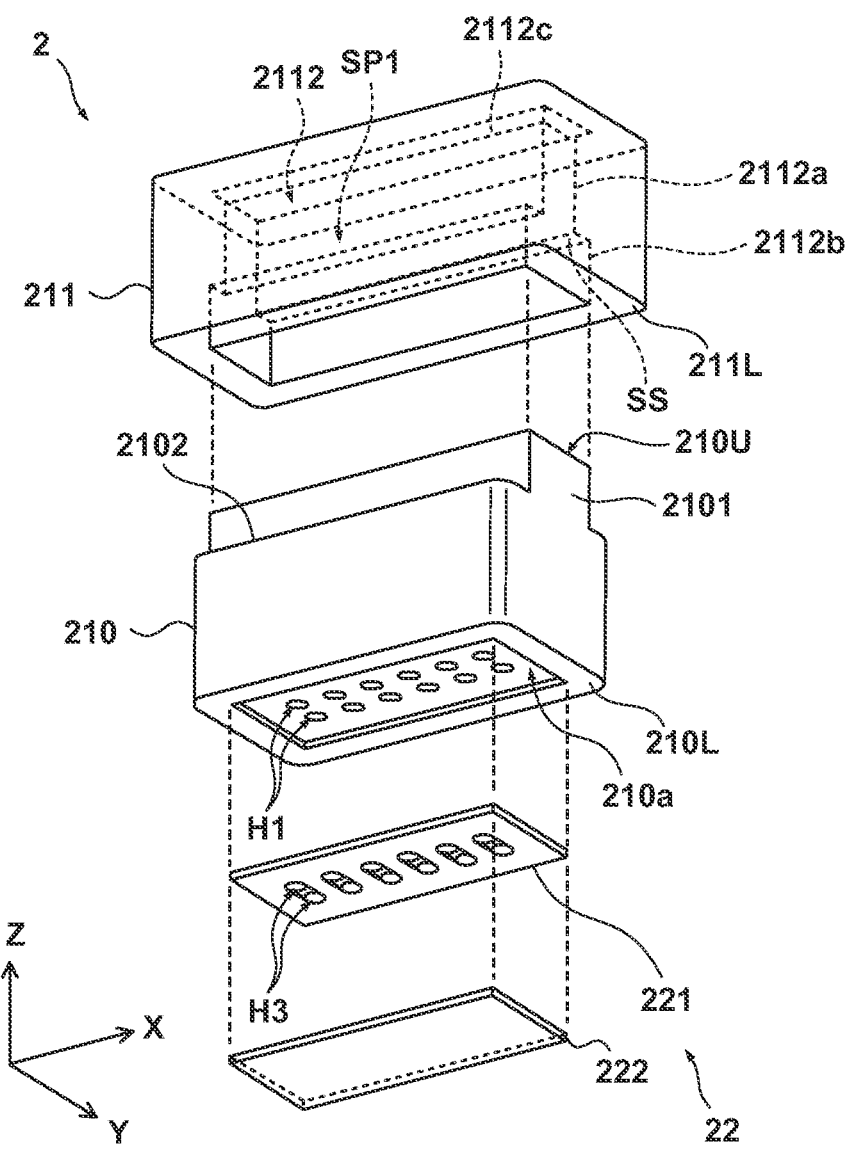
FIG. 4 is an exploded view showing the observation holder.

FIG. 3 shows a perspective view of the observation holder 2. FIG. 4 shows an exploded view of the observation holder 2. The observation holder 2 includes an accommodation unit 21 and the observation unit 22. Note that FIGS. 3 and 4 depict the X, Y, and Z directions corresponding to those shown in FIG. 2.

The accommodation unit 21 has a rectangular shape, that is, an oblong shape in this embodiment in a planar view (a view point in the Z direction, a top view), and can accommodate the observation target described above. In this embodiment, the accommodation unit 21 includes an accommodation unit main body 210 and an accommodation unit upper portion 211. The accommodation unit main body 210 has a projection 2101 in the central portion along a lateral direction (the Y direction in FIG. 3) in a planar view. The projection 2101 is extended in a longitudinal direction (the X direction in FIG. 3) in a planar view. As a consequence, step surfaces 2102 are formed on the both sides of the projection 2101.

A plurality of holes H1 for accommodating an observation target are formed to be spaced apart from each other in the projection 2101 of the accommodation unit main body 210. The plurality of holes H1 are arrayed in the X direction and the Y direction, and each hole H1 is so formed as to extend through the projection 2101 in the Z direction. A hydrophilic treatment can be performed on each surface of the plurality of holes H1 formed in the accommodation unit main body 210 and brought into contact with a liquid. An upper surface 210U of the projection 2101 is planarized, and each hole H1 has an opening end in the upper surface 210U. That region of the upper surface 210U, which includes the holes H1 and their surroundings, is a flat region 210R (see FIG. 3).

The accommodation unit upper portion 211 is formed on the upper portion of the accommodation unit main body 210, and has an opening 2112 for forming a space above the flat region 210R of the accommodation unit main body 210 when the accommodation unit upper portion 211 is set on the accommodation unit main body 210. In other words, the space surrounded by walls 2111a in the accommodation unit upper portion 211 is the opening 2112. The opening 2112 is formed to extend through the accommodation unit upper portion 211, and has different opening areas in the upper and lower portions of the accommodation unit upper portion 211. A lower opening 2112b is a portion into which the projection 210 is inserted, and is formed to have almost the same size as that of the shape of the projection 210.

On the other hand, an upper opening 2112a is a portion that forms a space above the flat region 210R, and is formed to have almost the same size as that of the shape of the flat region 210R. That is, the opening area of the upper opening 2112a is smaller than that of the lower opening 2112b. A portion of the upper surface 210U of the projection 210 engages with a step surface SS between the upper opening 2112a and the lower opening 2112b, and as a consequence the flat region 210R faces the upper opening 2112a. At the same time, a portion of a lower portion 211L of the accommodation unit upper portion 211 engages with the step surface 2102 of the accommodation unit main body 210. In this state, the space surrounded by the upper opening 2112a and the flat region 210R functions as a storage for storing a predetermined liquid. Note that an uppermost portion 2112c of the opening 2112 is formed to increase in a tapered shape.

As described above, the opening 2112 has different sectional areas in the upper and lower portions of the accommodation unit upper portion 211, and the storage volume is decreased by forming the storage in the upper opening 2112a having a small sectional area. This makes it possible to decrease the amount of a liquid to be stored in the storage. Also, a hydrophilic treatment like that performed on the surfaces forming the plurality of holes H1 can be performed on the surfaces formed as the storage in the accommodation unit upper portion 211 and brought into contact with a stored liquid. As the liquid, a liquid culture medium corresponding to an observation target can be used, but it is also possible to use other solutions such as a normal saline solution.

As will be described in detail later, the plurality of holes H1 formed in the accommodation unit main body 210 are not used independently of each other, but used as a U-shaped path by pairing adjacent holes H1 two by two and connecting the lower ends of the holes H1 in the observation unit 22.

In this embodiment, the accommodation unit main body 210 is made of a non-translucent material. Also, the accommodation unit upper portion 211 is made of a translucent material. Note that "non-translucent" means that the transmittance of visible light is relatively low. For example, the transmittance is 50% or less, preferably 30% or less, and more preferably 10% or less. Also, "translucent" means that the transmittance of visible light is relatively high. For example, the transmittance is 50% or more, preferably 70% or more, and more preferably 90% or more. As another embodiment, the accommodation unit upper portion 211 can also be made of a non-translucent material.

Note that each of the accommodation unit main body 210 and the accommodation unit upper portion 211 can be formed by one member, and, when each of them is formed by one member, both of them are preferably made of a non-translucent material.

The observation unit 22 is formed below the accommodation unit 21, and so configured that an observation target accommodated in the accommodation unit 21 can be observed from below by using the imaging unit 12. The observation unit 22 includes a plate (first plate) 221 and a plate (second plate) 222. The plate 221 covers the accommodation unit main body 210 from below, and the plate 222 covers the plate 221 from below. The plate 222 covers the plate 221 from below and is made of a practically translucent material. The plate 221 is partially made of a translucent material in this embodiment, but can also be entirely made of a non-translucent material or a reflective material. It is also possible to use a material having a dark-color (for example, black) surface. As the plate 221, it is possible to use, for example, a silicon disk (silicon wafer) microfabricated by anisotropic dry etching (inductively coupled plasma-reactive ion etching). In this embodiment, rectangular members having the same size in a planar view are used as the plates 221 and 222. At least one of the plates 221 and 222 can be formed such that the abovementioned two adjacent holes H1 communicate with each other. This will be described below with reference to FIG. 5.

Figure 5:
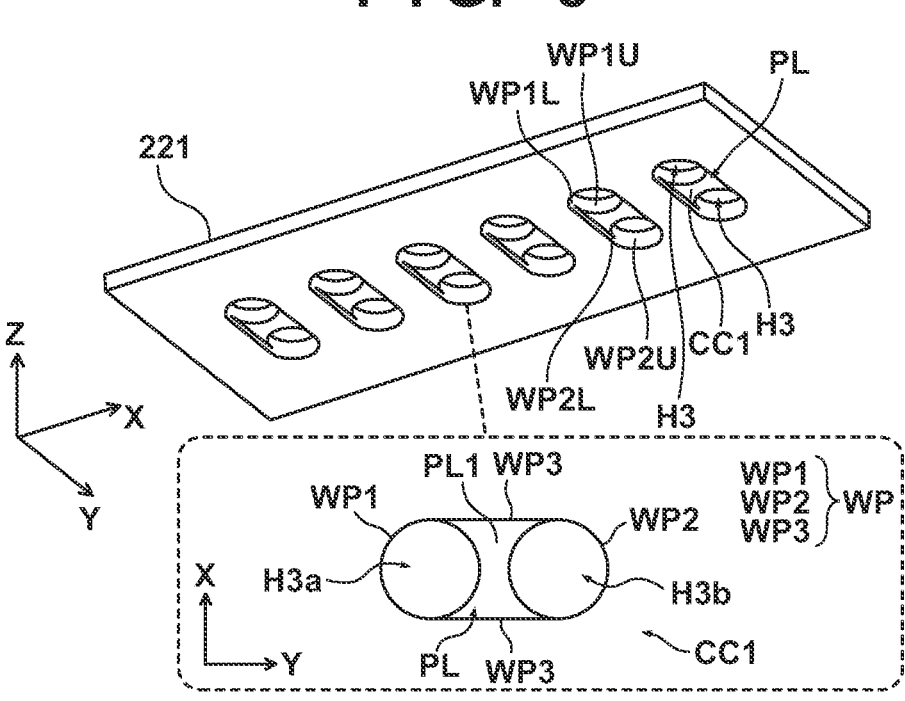
FIG. 5 is a perspective view of a plate forming a part of an observation unit.

FIG. 5 is a perspective view of the plate 221. In this embodiment, a plurality of through holes H3 corresponding to the plurality of holes H1 are formed in the plate 221. A cavity CC1 for connecting two adjacent holes (for example, H3*a* and H3*b*) of the plurality of through holes H3 is formed in the lower surface of the plate 221. The cavity CC1 is formed such that its outer edge surrounds the two through holes H3. That is, on the upper surface side of the plate 221, the plurality of through holes H3 are formed independently of each other in positions corresponding to the plurality of holes H1. On the lower surface side of the plate 221, however, the plurality of through holes H3 are partially not independent of each other because the two adjacent holes H3 communicate with each other by the cavity CC1. In this embodiment, the cavity CC1 is formed into an elliptical shape in a planar view. The cavity CC1 can also be called a terrace, a recess, or the like.

The cavity CC1 includes a flat portion PL between the two adjacent through holes H3. The flat portion PL includes a flat surface PL1. Also, the outer edge of the cavity CC1 is formed by side walls WP. The side walls WP include circumferential wall portions WP1 and WP2, and two wall portions WP3. The circumferential wall portions WP1 and WP2 correspond to the circumferential portions of the ellipse, and the circumferential wall portions WP3 correspond to straight portions of the ellipse. In addition, the circumferential wall portion WP1 faces one (in this case, H3*a*) of the two through holes H3, and the circumferential wall portion WP2 faces the other (in this case, H3*b*) of the two through holes H3.

More specifically, the circumferential wall portion WP1 includes a cylindrical upper circumferential wall portion WP1U formed to have the same size as that of the through hole H3, and a semi-cylindrical lower circumferential wall portion WP1L formed to be continuous to the upper circumferential wall portion WP1U and to have the same size as that of the upper circumferential wall portion WP1U. Also, as in the circumferential wall portion WP1, the circumferential wall portion WP2 includes a cylindrical upper circumferential wall portion WP2U formed to have the same size as that of the through hole H3, and a semi-cylindrical lower circumferential wall portion WP2L formed to be continuous to the upper circumferential wall portion WP2U and to have the same size as that of the upper circumferential wall portion WP2U.

The two circumferential wall portions WP3 are so formed as to form continuous surfaces connecting to the circumferential wall portions WP1 and WP2. More specifically, the circumferential wall portions WP3 are formed as continuous surfaces that connect the lower circumferential wall portion WP1L of the circumferential wall portion WP1 to the lower circumferential wall portion WP2L of the circumferential wall portion WP2, which is formed to correspond to the lower circumferential wall portion WP1L of the circumferential wall portion WP1, and that have the same height as that of the lower circumferential wall portions WP1L and WP2L.

In this embodiment, each through hole H3 is formed into an almost circular shape in a planar view, each of the upper circumferential wall portions WP1U and WP2U of the circumferential wall portions WP1 and WP2 is formed to draw a circle having the same diameter as that of the through hole H3, each of the lower circumferential wall portions WP1L and WP2L of the circumferential wall portions WP1 and WP2 is formed to draw an arc of a semicircle having the same diameter as that of the through hole H3, and the circumferential wall portion WP3 is so formed as to draw an almost straight line.

Figure 6:
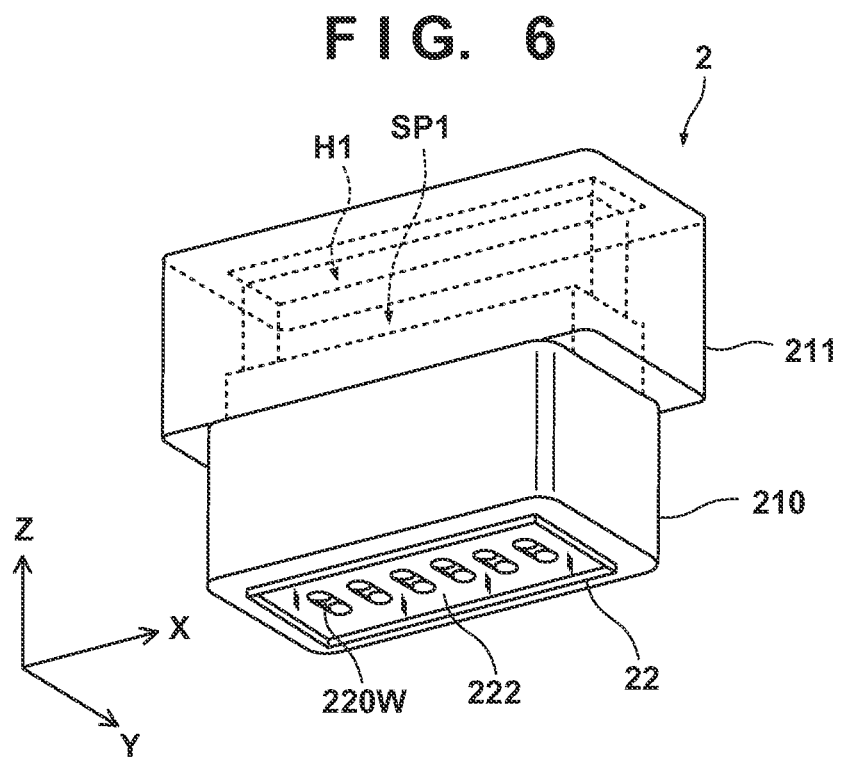
FIG. 6 is a lower side perspective view showing the observation holder.

Since the plate 222 having a flat plate shape covers the lower surface, that is, the cavity CC1 of the plate 221 formed as described above, a passage formed by a space surrounded by the circumferential wall portions WP1, WP2, and WP3, the flat portion PL, and the plate 221 is formed as a passageway 220W (see FIG. 6). Consequently, the lower portions of the two adjacent through holes H3 are connected via the passageway 220W, so the two through holes H3 connect to each other to form one passage. By making the through holes H3 respectively corresponding to the two adjacent holes H1 communicate with each other on the upper surface side of the plate 221, the imaging unit 12 can observe an observation target accommodated in the accommodation unit 21 when the observation target stays in the passageway 220W. Also, a hydrophilic treatment can be performed on each surface of the cavity CC1 that forms the passageway 220W by making the plurality of adjacent holes H1 communicate with each other, and comes in contact with a liquid moving through the passageway 220W.

Note that the shape of the side wall WP is not limited to that of this embodiment, and need only be so formed as to include the two through holes H3 in a planar view. Note also that the size (diameter) of the through hole H3, the size (diameter) of WP1, and the size (diameter) of WP1 are preferably set such that their arcs match (that is, are preferably the same size). However, they can also be different sizes provided that there is no influence on visibility or the like during observation.

Referring to FIG. 4 again, a defining portion 210a for defining the position of the plate 221 is formed in the main body lower portion 210L of the accommodation unit main body 210. In this embodiment, the defining portion 210a is a depressed portion formed by depressing the bottom surface of the accommodation unit main body 210, and the shape of this depressed portion follows the outer shape of the plate 221 in a planar view. The depth of the depressed portion is equal to or larger than the thickness of the plate 221. By fitting the plate 221 of the observation unit 22 in the depressed portion as the defining portion 210a, it is possible to appropriately position the observation unit 22 with respect to the accommodation unit 21. In practice, however, it is only necessary to be able to appropriately align the upper circumferential wall portions WP1U and WP2U of the circumferential wall portions WP1 and WP2 corresponding to the through holes H3. Instead/in addition, a predetermined mark such as printing or a notch can also be formed as the defining portion 210a.

FIG. 6 shows a lower side perspective view of the observation holder 2 obtained by assembling the accommodation unit 21 and the observation unit 22 described above. The plate 222 of the observation unit 22 is made of a translucent material. Accordingly, the imaging unit 12 (see FIGS. 1 and 2) can capture an image of an observation target via the observation unit 22 when the observation target stays in the passageway 220W connecting the two through holes H3 (for example, H3a and H3b).

As the flat surface PL1 forming a part of the passageway 220W, the entire region between the two through holes H3 (for example, H3a and H3b) is preferably formed as a flat surface, but the flat surface PL1 included in the flat portion PL can also be formed in only a part of that region. In this case, a step can exist in a part of that region (the flat surface PL1 can exist at a height different from that of the rest of the flat portion PL).

Since the plate 222 having a flat plate shape covers the lower surface, that is, the cavity CC1 of the plate 221 formed as described above, a passage formed by a space surrounded by the circumferential wall portions WP1, WP2, and WP3, the flat portion PL, and the plate 222 is formed as a passageway 220W (see FIG. 6). Consequently, the lower portions of the two adjacent through holes H3 are connected via the passageway 220W, so the two through holes H3 connect to each other to form one passage. By making the through holes H3 respectively corresponding to the two adjacent holes H1 communicate with each other on the upper surface side of the plate 221, the imaging unit 12 can observe an observation target accommodated in the accommodation unit 21 when the observation target stays in the passageway 220W. Also, a hydrophilic treatment can be performed on each surface of the cavity CC1 that forms the passageway 220W by making the plurality of adjacent holes H1 communicate with each other, and comes in contact with a liquid moving through the passageway 220W.

When an observation target is a blood, for example, the hole H1 and the through hole H3 can be formed to have a diameter of about 700 [μm] to 1,300 [μm], more preferably about 900 [μm] to 1,100 [μm], and further preferably about 1,000 [μm]. The distance between the two through holes H3 can be about 350 [μm] to 650 [μm], more preferably about 450 [μm] to 550 [μm], and further preferably about 500 [μm]. In this case, the cavity CC1 can be determined in accordance with the size of particles existing in a body fluid to be used. When using a human blood, for example, the depth can be about 2 [μm] to 7 [μm], more preferably about 3 [μm] to 5 [μm], and further preferably about 4 [μm] in accordance with the size of white blood cells. When using cancer cells separated from a tissue, the depth can be about 12 [μm] to 5 [μm], preferably about 10 [μm] to 6 [μm], and more preferably about 8 [μm]. Note that when forming the flat surface PL1 including a step on the flat portion PL, it is possible to set the depth of the flat portion PL at 50 to 100 [μm], and set the distance between the flat surface PL1 and the surface of the plate 222 forming the passageway 220W to a distance which is smaller than the size of particles existing in a body fluid or the like to be used and at which the particles can move.

Referring to FIG. 4 again, a defining portion 210a for defining the position of the plate 221 is formed in the main body lower portion 210L of the accommodation unit main body 210. In this embodiment, the defining portion 210a is a depressed portion formed by depressing the bottom surface of the accommodation unit main body 210, and the shape of this depressed portion follows the outer shape of the plate 221 in a planar view. The depth of the depressed portion is equal to or larger than the thickness of the plate 221. By fitting the plate 221 of the observation unit 22 in the depressed portion as the defining portion 210a, it is possible to appropriately position the observation unit 22 with respect to the accommodation unit 21. In practice, however, it is only necessary to be able to appropriately align the upper circumferential wall portions WP1U and WP2U of the circumferential wall portions WP1 and WP2 corresponding to the holes H1. Instead/in addition, a predetermined mark such as printing or a notch can also be formed as the defining portion 210a.

Figures 7A, 7B:
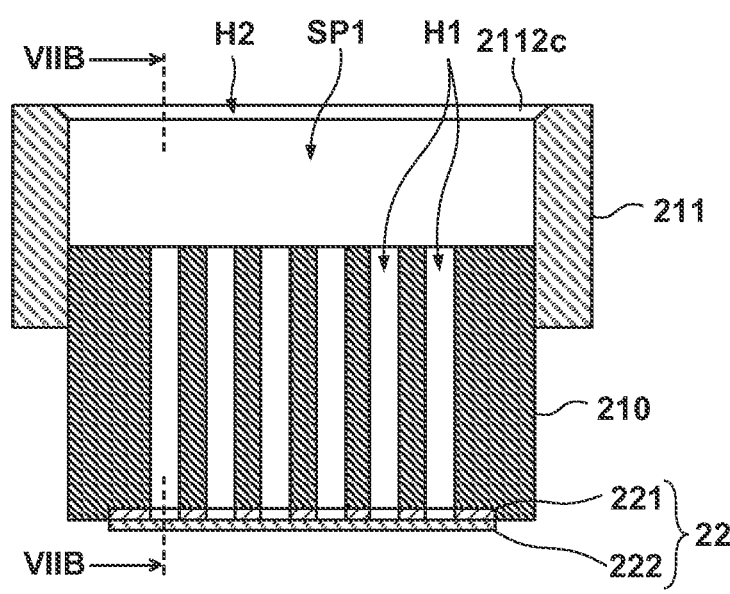
FIG. 7A is a sectional view showing the observation holder.
FIG. 7B is a sectional view showing the observation holder.

In this embodiment, as can be seen from FIGS. 7A and 7B, the accommodation unit main body 210 and the accommodation unit upper portion 211 are so configured that their widths in one direction (in this case, the Y direction) of the horizontal direction are equal to each other. This makes it possible to decrease the size of the accommodation unit 21, that is, the observation holder 2 itself, and to densely array a plurality of observation holders 2 on the support base 11. In this embodiment, the dense array is possible in particularly one direction (int this case, the Y direction) of the horizontal direction.

Also, in this embodiment, the accommodation unit main body 210 and the accommodation unit upper portion 211 are so configured that their widths in the other direction (in this case, the X direction) of the horizontal direction are different from each other. A configuration like this can decrease the size of the observation unit 22 in which the cavity CC1 as the imaging range of the imaging unit 12 is formed, the size of the accommodation unit main body 210 in which the plurality of holes H1 are formed, and the size of the accommodation unit upper portion 211 in which the opening 2112 is formed, and can reduce the amount of the manufacturing materials of the observation holder 2. It is also possible to prevent the user from failing to hold the observation holder 2 (and, for example, an accompanying fall of the observation holder 2). Note that these widths can be different from each other in one of the X and Y directions, and can also be equal to each other in both the directions as another embodiment.

As shown in FIG. 3, an information portion 23 is formed in the accommodation unit upper portion 211 of the observation holder 2 of this embodiment. More specifically, the information portion 23 is formed on an accommodation unit upper portion upper surface 211U. The information portion 23 can give information about an observation target. This information can also be expressed as observation target information, and examples of the information are the name of a subject and the collection date of an observation target. The information can also be code information to be managed in association with the name of a subject, the collection date of an observation target, and the like. As this code data, it is possible to use, for example, number information using a combination of a plurality of numbers, or two-dimensional data information (for example, a barcode or a QR code). The code information can be read by a code information reader (not shown). The information portion 23 can be formed such that the observation target information can be printed, and can also be formed such that a seal on which the observation target information is described can be adhered. The user can manage an observation target relatively easily by using the information portion 23.

(Methods of Accommodating and Observing Observation Target)

The user can access a given hole H1 from the opening H2 of the observation holder 2 supported on the preparation support base 141 by using a predetermined instrument such as a syringe or a dropper, and can accommodate an observation target in each hole H1. More specifically, a predetermined liquid (liquid culture medium) is filled in the space SP1 and the hole H1, and then an observation target (for example, a blood) is rapidly injected into one of two adjacent holes (a pair of holes) H1 connected by the observation unit 22. Consequently, a part of the liquid flows into the passageway 220W and the cavity CC1. If cells sufficient for observation do not flow into the cavity CC1, the cells can be supplied to the cavity CC1 by performing negative pressure suction in the other hole H1. As can be understood from FIG. 3, the uppermost portion 2112c of the opening 2112 can be so formed as to form an inclined surface or the like. This allows the user to appropriately access a given hole H1 from the opening 2112.

The observation holder 2 in which the observation target is already accommodated is transferred to the support base 11, and the observation target can be observed by the imaging unit 12 from below the observation holder 2 via the observation unit 22.

In this embodiment as described earlier, the accommodation unit main body 210 is made of a non-translucent material, and the accommodation unit upper portion 211 is made of a translucent material. Since the accommodation unit main body 210 is made of a non-translucent material, the contrast between the flat surface PL1 as an observation target portion and the through hole H3 as a non-observation target portion can be increased. Accordingly, an observation target injected into a portion of the flat surface PL1 as an observation target portion can easily be observed from below by the imaging unit 12 via the observation unit 22. In addition, since the accommodation unit upper portion 211 is made of a translucent material, the user can visually confirm the interiors of the opening 2112 and each hole H1 both from above and from side to side when accommodating an observation target in the hole H1.

As another embodiment, it is also possible to automatically accommodate an observation target by using an automatic machine, instead of the work in which the user accesses a given hole H1 from the opening 2112 and accommodates an observation target in each hole H1 by using a predetermined instrument such as a syringe or a dropper. In this case, the accommodation unit upper portion 211 need not be made of a translucent material, and both the accommodation unit main body 210 and the accommodation unit upper portion 211 can be made of a non-translucent material. When both the accommodation unit main body 210 and the accommodation unit upper portion 211 are made of a non-translucent material, the position of each hole H1 can visually be confirmed from above by a detecting means (for example, a camera) included in the automatic machine, so the work of accommodating an observation target can efficiently be performed.

Referring to FIG. 2 again, the support base 11 for supporting the observation holder 2 includes the recess 111 on which the observation holder 2 is mounted by being fitted therein, and the opening 112 vertically extending through the bottom portion of the recess 111. Since the mounting portion 111b of the recess 111 supports the lower surface of the peripheral portion of the plate 222, the height to the flat surface PL1 as an observation target portion is maintained constant, and this can appropriately implement observation of an observation target from below by the imaging unit 12. This similarly applies to the preparation support base 141.

The observation holder 2 can be disposed after the observation of the observation target is complete, and hence can also be called a disposable holder or the like. That is, when using a disposable holder as the observation holder 2 (when using a holder whose disposal is recommended after it is once used), it is possible to further prevent mixing of an observation target different from a measurement sample, that is, contamination. Accordingly, the whole observation holder 2 can also be unitized. For example, it is possible to non-detachably fix the accommodation unit 21 and the observation unit 22 (elements configuring them), and to non-detachably fix the accommodation unit main body 210 and the accommodation unit upper portion 211 in the accommodation unit 21.

In this embodiment, the observation holder 2 as a disposable holder is downsized by giving respective corresponding shapes or outer shapes to the observation unit 22 including the cavity CC1, the accommodation unit main body 210 including the plurality of holes H1, and the accommodation unit upper portion 211 including the opening 2112, and hence is usable effectively.

(Method of Manufacturing Observation Unit)

As described earlier, the observation unit 22 including the plates 221 and 222 is formed below the accommodation unit 21. As a consequence, the accommodation unit 21 and the observation unit 22 form a vessel. In this viewpoint, the observation unit 22 can also be called an accommodation unit bottom portion, a vessel bottom portion, or the like, and the observation holder 2 can also be called an observation vessel or the like. The observation unit 22 like this can individually be prepared as an observation chip attachable as a component to the observation holder 2, and can be manufactured by using a well-known semiconductor manufacturing technique.

FIGS. 8A to 8I are views for explaining the steps of a method of manufacturing the observation unit 22. An outline of this manufacturing method is to place the plate 222 on the lower surface of the plate 221 and bond the plates 221 and 222 by anodic bonding. Note that main steps of this manufacturing method will be focused and described below in order to simplify the explanation, but washing, annealing, and the like can also be performed properly as needed.

Figures 8A, 8B, 8C, 8D, 8E:
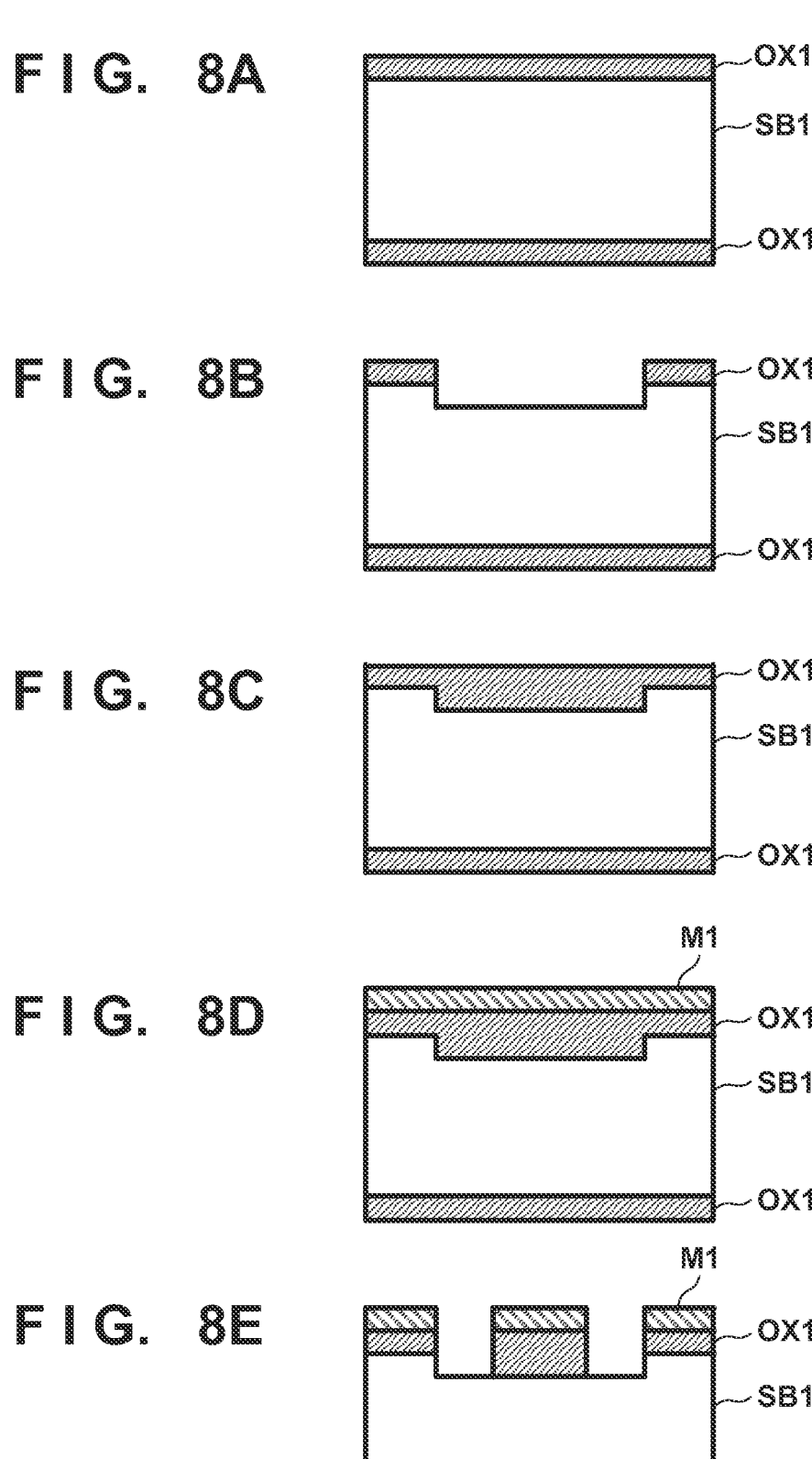
FIG. 8A is a view for explaining a manufacturing method of the observation unit.
FIG. 8B is a view for explaining the manufacturing method of the observation unit.
FIG. 8C is a view for explaining the manufacturing method of the observation unit.
FIG. 8D is a view for explaining the manufacturing method of the observation unit.
FIG. 8E is a view for explaining the manufacturing method of the observation unit.

In the step shown in FIG. 8A, a semiconductor substrate SB1 as a material of the plate 221 is prepared and oxidized. A silicon substrate can preferably be used as the semiconductor substrate SB1. Note that the film thickness of an oxide film OX1 formed in this step is about 0.12 μm (1,200 Å).

In the step shown in FIG. 8B, the surface of the structure (this expression will be used including the oxide film OX1 to simplify the explanation, and this similarly applies to the following explanation) obtained in the step in FIG. 8A is partially etched, thereby partially removing the oxide film OX1 so as to expose a portion of the upper surface of the semiconductor substrate SB1, and partially removing the exposed semiconductor substrate SB1. This etching process is performed by, for example, inductively coupled plasma etching. A portion removed by etching will be called an etching portion hereinafter.

In the step shown in FIG. 8C, the upper surface of the structure obtained in the step shown in FIG. 8B is oxidized, thereby covering the etching portion and the existing oxide film OX1 with a new oxide film OX1. In this step, the semiconductor substrate SB1 having a step on the upper surface and the oxide film OX1 covering the upper surface are obtained. After the oxidation, the upper surface of the oxide film OX1 can also be planarized by performing polishing such as CMP (Chemical Mechanical Polishing).

In the step shown in FIG. 8D, a metal film M1 is formed on the upper surface of the structure obtained in the step shown in FIG. 8C. This step can be performed by a well-known deposition method such as sputtering. Aluminum can preferably be used as the material of the metal film M1. Note that the film thickness of the metal film M1 formed in this step is about 0.4 μm.

In the step shown in FIG. 8E, the upper surface of the structure obtained in the step shown in FIG. 8D is partially etched, thereby partially removing the metal film M1 and the oxide film OX1 so as to partially expose the upper surface of the semiconductor substrate SB1, and partially removing the exposed semiconductor substrate SB1.

In the step shown in FIG. 8F, the etching portion formed in the step shown in FIG. 8E is deepened by further etching the etching portion formed in the step shown in FIG. 8E. Consequently, the etching portion reaches the vicinity of the oxide film OX1 on the lower surface side of the semiconductor substrate SB1.

In the step shown in FIG. 8G, polishing such as CMP is performed on the lower surface side of the structure obtained in the step shown in FIG. 8F, thereby changing the etching portion into through holes H3 extending through the semiconductor substrate SB1.

In the step shown in FIG. 8H, the metal film M1 and the oxide film OX1 are removed from the structure obtained in the step shown in FIG. 8G, and surface oxidation is additionally performed to form an oxide film (not shown). The structure thus obtained is a plate 221.

In the step shown in FIG. 8I, a plate 222 is placed on the plate 221 obtained in the step shown in FIG. 8H, and these plates are bonded by anodic bonding. A material that is transparent and secures flatness is adopted as the material of the plate 222, so bonding can also be performed by another appropriate bonding method such as solid-phase bonding in accordance with the adopted material. The observation unit 22 can be manufactured by the above procedure.

An observation chip functioning as the observation unit 22 described above is actually obtained by collectively manufacturing a plurality of plates 221 at once. To manufacture a plurality of observation chips at once, the above-mentioned processing for manufacturing a plurality of plates 221 is performed on a first mother plate (in this case, a silicon substrate) having a predetermined size with which the plurality of plates 221 can be processed. Then, a second mother plate (in this case, a glass plate) having the same size as that of the first mother plate is placed on it, and the two plates are bonded. After that, a cutting step is performed to cut the bonded first and second mother plates into chips by dicing or the like. As a consequence, a plurality of observation chips can be manufactured at once.

Note that when manufacturing different types of observation chips each having the flat surface PL1 including a step in the flat portion PL, a shadow may be formed in the boundary between the flat surface PL1 and another surface of the flat portion PL. Therefore, the step wall surface formed as a step is preferably processed into a right angle so as to be perpendicular to other surfaces. This can be achieved by a manufacturing method similar to the above-described manufacturing method. In this manufacturing method, a silicon substrate (silicon wafer) having a thickness that enables right-angle processing is preferably used in order to process the boundary portion into a right angle.

SUMMARY

In this embodiment, the observation holder 2 includes the accommodation unit 21 and the observation unit 22. The accommodation unit 21 has a rectangular shape in a planar view and can accommodate an observation target (for example, a blood). The observation unit 22 is formed on the lower portion of the accommodation unit 21 and so configured that an observation target accommodated in the accommodation unit 21 can be observed from below. The accommodation unit 21 includes the accommodation unit main body 210 and the accommodation unit upper portion 211 formed above the accommodation unit main body 210. The plurality of holes H1 for accommodating observation targets are formed in the accommodation unit main body 210. The accommodation unit upper portion 211 includes the walls 2111a surrounding the opening 2112 in the upper portion of the accommodation unit main body 210. The walls 2111a function as a storage or a dam for storing a predetermined liquid (liquid culture medium) in the opening 2112. The plurality of holes H1 are arrayed in the horizontal direction, and each hole H1 vertically extends through the accommodation unit main body 210 and communicates with the opening 2112. Also, two adjacent holes H1 of the plurality of holes H1 are connected in the observation unit 22.

In the configuration like this, an observation target that can be positioned between two adjacent holes H1 can be observed from below via the observation unit 22. When a plurality of observation holders 2 are arranged on the predetermined support base 11, therefore, it is possible to simply and efficiently observe many observation targets or a plurality of different characteristics of one observation target at once. Also, a hydrophilic treatment is performed on each surface that comes in contact with a liquid, and this makes it possible to easily and reliably store the liquid, inject samples, and arrange the samples in the observation position. In addition, any of the plurality of holes H1 can be accessed from the opening H2. Therefore, the user such as a medical doctor, a laboratory technician, or a researcher can relatively easily accommodate an observation target in a given hole H1.

In the above explanation, each element is denoted by a name related to its function in order to facilitate understanding. However, each element is not limited to a member having the contents explained in the embodiment as its main function and can also include the contents explained in the embodiment as its auxiliary function.

The invention claimed is:

1. An observation holder including an accommodation unit having a rectangular shape in a planar view and configured to accommodate an observation target, and an observation unit formed below the accommodation unit, wherein
   the observation unit is configured such that the observation target accommodated in the accommodation unit can be observed from below,
   the accommodation unit includes:
      an accommodation main body in which a plurality of holes for accommodating the observation target are formed to be spaced apart from each other; and
      an accommodation upper portion formed on an upper portion of the accommodation main body, the accommodation upper portion includes:

a wall surrounding a space above the accommodation main body, as a storage for storing a predetermined liquid; and an opening formed above the space, wherein the observation unit includes:

a first plate covering the accommodation unit main body from below, the first plate having a plurality of through holes corresponding to the plurality of holes; and a translucent second plate covering the first plate from below, a cavity is formed in a lower surface of the first plate, the cavity connecting two adjacent through holes and having an outer edge surrounding the two adjacent through holes, the cavity and the second plate form a passageway connecting the two adjacent through holes, the passageway forming a connecting vessel.

2. The observation holder according to claim 1, wherein the wall surrounds the plurality of holes in a form of a rectangle along a horizontal direction in which the plurality of holes are arrayed.

3. The observation holder according to claim 1, wherein the accommodation main body is made of a non-translucent material, and the accommodation upper portion is made of a translucent material.

4. The observation holder according to claim 1, wherein both of the accommodation main body and the accommodation upper portion are made of a non-translucent material.

5. The observation holder according to claim 4, wherein the accommodation main body and the accommodation upper portion are configured to have equal widths in one direction in a horizontal direction.

6. The observation holder according to claim 1, wherein the cavity forms a flat surface between the two adjacent through holes, the flat surface allowing the observation target to be observed from below through the second plate.

7. The observation holder according to claim 6, wherein side walls forming the cavity include:

a first circumferential wall formed along a part of an outer edge of one of the two adjacent through holes;

a second circumferential wall formed along a part of an outer edge of the other one of the two adjacent through holes; and a third circumferential wall forming a continuous surface by connecting the first circumferential wall and the second circumferential wall.

8. The observation holder according to claim 1, wherein a defining portion for defining a position of the first plate is formed in a lower surface of the accommodation main body.

9. The observation holder according to claim 1, including information about the observation target, which is printed or adhered to the observation holder.

10. An observation apparatus comprising:

a support base on which a plurality of observation holders defined in claim 1 are arranged, and configured to support the plurality of observation holders such that the plurality of observation holders are arrayed in a horizontal direction;

a camera configured to capture an image of the observation target accommodated in the plurality of observation holders; and a first rail configured to slidably support the camera relative to the support base in the horizontal direction.

11. The observation apparatus according to claim 10, further comprising:

a support configured to support each of the plurality of observation holders in a state before the observation target is accommodated, and a second rail capable of slidably supporting the support in a predetermined direction.

12. An observation chip attachable, as a component of an observation unit, to an observation holder including an accommodation unit configured to accommodate an observation target and the observation unit formed on a lower portion of the accommodation unit, wherein a plurality of holes for accommodating an observation target are formed in the accommodation unit such that the plurality of holes extend in a vertical direction and are arranged in a horizontal direction, the observation chip includes:

a first plate configured to cover the accommodation unit from below; and a translucent second plate configured to cover the first plate from below, a plurality of through holes corresponding to the plurality of holes are formed in the first plate, and a cavity that connects two adjacent through holes of the plurality of through holes and has an outer edge surrounding the two through holes is formed in a lower surface of the first plate, side walls forming the cavity include:

a first circumferential wall formed along a part of an outer edge of one of the two adjacent through holes;

a second circumferential wall formed along a part of an outer edge of the other one of the two adjacent through holes; and a third circumferential wall forming a continuous surface by connecting the first circumferential wall and the second circumferential wall.

13. A method of manufacturing an observation chip defined in claim 12, comprising:

a step of laying the second plate on a lower surface of the first plate; and a step of bonding the first plate and the second plate by anodic bonding.

* * * * *